(12) United States Patent
Zimmer

(10) Patent No.: US 6,554,477 B1
(45) Date of Patent: Apr. 29, 2003

(54) WIPER BEARING FOR A WIPER DEVICE OF A VEHICLE AND FOR MOUNTING A WIPER BEARING

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 09/868,148

(22) PCT Filed: Oct. 12, 2000

(86) PCT No.: PCT/DE00/03586

§ 371 (c)(1),
(2), (4) Date: Jun. 15, 2001

(87) PCT Pub. No.: WO01/28827

PCT Pub. Date: Apr. 26, 2001

(30) Foreign Application Priority Data

Oct. 21, 1999  (DE) ......................................... 199 50 739

(51) Int. Cl.⁷ .............................. F16C 33/74; B60S 1/24
(52) U.S. Cl. ..................... 384/130; 15/250.31; 384/138
(58) Field of Search ........................... 15/250.3, 250.31; 384/130, 138, 140, 151, 276, 295

(56) References Cited

U.S. PATENT DOCUMENTS

| 5,211,485 | A | * | 5/1993 | Hoshino ..................... 384/276 |
| 5,735,171 | A | * | 4/1998 | Moote et al. ............. 15/250.31 |
| 6,138,320 | A | * | 10/2000 | Komo ......................... 384/397 |
| 6,227,747 | B1 | * | 5/2001 | Remington et al. ...... 15/250.31 |
| 6,238,094 | B1 | * | 5/2001 | Schabanel et al. .......... 384/296 |
| 6,287,007 | B1 | * | 9/2001 | Zimmer ..................... 384/140 |

FOREIGN PATENT DOCUMENTS

DE  195 42 875 A   5/1997
JP        251715   10/1995

* cited by examiner

Primary Examiner—Thomas R. Hannon
(74) Attorney, Agent, or Firm—Michael J. Striker

(57) ABSTRACT

The wiper bearing (10) includes a bearing shaft (11), which is received in a bearing housing (12) and is connected to a bearing element (15) and a wiper arm (17) in such a way that a torque can be transmitted from the bearing element (15) to the wiper arm (17). The bearing shaft (11) has an axial stop means (18) with a stop face (20). It is provided that the stop face (20) is operatively connected to a contact face (19) of the bearing housing (12), and the contact face (19) and/or the stop face (20) is surface-structured.

17 Claims, 5 Drawing Sheets

WIPER BEARING FOR A WIPER DEVICE OF A VEHICLE AND FOR MOUNTING A WIPER BEARING

BACKGROUND OF THE INVENTION

The invention relates to a wiper bearing for a vehicle wiper system, including a bearing shaft that is received in a bearing housing and is connected to a bearing element and a wiper arm in such a way that a torque can be transmitted from the bearing element to the wiper arm, the bearing shaft having an axial stop means with a stop face.

The invention also relates to a method for mounting a wiper bearing.

Wiper bearings for a vehicle wiper system are known that disadvantageously have a relatively high number of mounting parts and therefore entail relatively major effort and expense for mounting them. The high number of mounting parts needed to produce a known wiper bearing has an especially disadvantageous effect on the resultant production costs, mounting times, and qualtity assurance of the wiper bearing. The relatively high number of construction parts to produce a known wiper bearing can be ascribed to the fact, among others, that for correct operation of the wiper bearing, one of more adjusting parts, securing elements, sealing elements and/or spring elements must be provided.

SUMMARY OF THE INVENTION

The wiper bearing of the invention is characterized in that the stop face is operatively connected to a contact face of the bearing housing, and the contact face and/or the stop face is surface-structured. Because of the surface structuring of the contact face and/or the stop face, it is possible in a simple and effective way, by means of the operative connection between the stop face and the contact face, simultaneously and reliably to achieve an adjusting, securing, tolerance-compensation and sealing function. These various functions are significant for correct operation of the wiper bearing and can advantageously be achieved by the surface-structured contact face and/or the surface-structured stop face by means of their operative connection. This kind of surface structuring of the applicable face is feasible relatively simply from a production standpoint. Since the surface structuring is provided on the contact face of the bearing housing or (alternatively or additionally) on the stop face of the bearing shaft, it is possible to limit the number of construction parts for producing the wiper bearing to a minimum, that is, to two components (the bearing shaft and the bearing housing). The wiper bearing of the invention is thus simple to produce from a production standpoint and is constructed in a way that makes it especially easy to mount.

Advantageously, the bearing housing radially surrounds the bearing shaft, and the bearing shaft has two ends protruding from the bearing housing, a first end being fastened to the bearing element and a second end being connected to the wiper arm. Such an arrangement of the bearing shaft and bearing housing makes it possible to use a bearing housing embodied as a relatively economical tubular semifinished product. The two ends of the bearing shaft that protrude from the bearing housing enable easy to mount fastening and connecting of this structural group (the bearing shaft and bearing housing) on the bearing element and on the wiper arm. The middle region of the bearing shaft can be received over its entire circumference by the tubular bearing housing, in such a way that the bearing shaft is supported firmly in the radial direction, that is, not radially displaceably, in the bearing housing.

Preferably, the stop face of the bearing shaft is embodied as smooth and the contact face of the bearing housing is embodied as surface-structured. Since the bearing housing can be produced in the form of a tubular semifinished product from a nonmetal material, such as plastic, as well, it is advantageous for both production-related and mounting-related reasons, especially with regard to the external connecting forces to be brought to bear during mounting into the bearing shaft and the bearing housing, to provide the surface structuring on the contact face of the bearing housing, while the stop face of the bearing shaft, which is usually made of a metal material, is embodied as smooth.

In a preferred embodiment, the stop means is embodied as an annular, closed collar protruding radially from the bearing shaft. Such a collar is relatively simply feasible from a production standpoint on a bearing shaft made preferably from a metal material. A stop means embodied as a collar also makes it possible to produce an especially compact wiper bearing, since the collar protruding radially from the bearing shaft is provided with the annularly embodied stop face of the bearing shaft, which can come into operative contact with a contact face of the bearing housing embodied as an annular end face in such a way that after the structural group of the bearing shaft and bearing housing is produced, a reliable, easily mounted and compact axial operative connection can be obtained between the bearing shaft and the bearing housing.

Advantageously, the surface-structured contact face is embodied as an annular end face of the bearing housing, the bearing housing having a receiving chamber that is rotationally symmetrical with respect to the longitudinal axis and in particular is cylindrical. A bearing housing designed in this way is distinguished by relatively low production costs and can be connected in an easily mounted way with the correspondingly embodied bearing shaft to make a compact structural group.

Advantageously, the surface-structured contact face has an axial sealing means, which as a closed ring is in touch contact with the stop face of the collar, forming a hermetic seal. An axial sealing means, embodied as a closed ring, on the contact face of the bearing housing is especially well suited for producing a hermetic seal between the surface-structured contact face and the stop face.

Advantageously, the sealing means is embodied as at least one annular bead on the contact face of the bearing housing, and the bearing housing is produced from a material that has a lower intrinsic rigidity than the material of the bearing shaft. Embodying an annular bead as a sealing means on the contact face of a plastically deformable bearing housing is especially well suited to achieving the various functions (adjusting, securing, sealing and tolerance compensation functions), which are all met by the operative connection between the bearing shaft and the bearing housing.

In a preferred embodiment, the stop face extends in the radial direction over the entire width of the collar. A smooth stop face extending radially over the entire collar is especially simple to make from a production standpoint and furthermore enables an easily mounted assembly of the wiper bearing, since the bearing housing merely has to be brought into operative contact with the stop face by axially approaching it along the longitudinal axis of the bearing shaft, and no special rotary motions, for instance, are necessary for establishing a certain mounting position of the bearing shaft.

In a further, alternative embodiment, the stop face is embodied as a bottom face of a receiving groove, in which the sealing means is shielded radially from the outside. A collar provided with a receiving groove is relatively simple to make without problems from a production standpoint and can advantageously be used as a receptacle across the end region, having the surface-structured contact face, of the tubular bearing housing. In this way, the contact, utilized in multiple ways, between the contact face and the stop face is protected against external factors that may possibly cause problems.

In an advantageous embodiment, the bearing shaft is secured to the bearing element by means of a rivet connection. The production of a rivet connection between the bearing shaft and the bearing element enables a fast, reliable and compact fastening of the wiper bearing to the bearing element. The possibility exists of utilizing an external, annular stop face of the collar to introduce a pressure force oriented parallel to the longitudinal axis in the direction of the bearing element, which force is necessary for establishing the rivet connection.

In a further advantageous embodiment, the bearing shaft is secured to the bearing element by means of a nonpositive connection. Fastening the bearing shaft to the bearing element by means of a nonpositive connection, for instance by calking the second end of the bearing shaft to the correspondingly embodied bearing element, is feasible in a simple and reliable way from a production standpoint. With a nonpositive connection of the bearing element and the bearing shaft as well, a compact design of the wiper bearing is possible.

The bearing shaft can be embodied in one piece. A one-piece bearing shaft allows an especially easily mounted production of the wiper bearing, since in this case the wiper bearing comprises only two component parts, that is, the one-piece bearing shaft and the one-piece bearing housing. A one-piece bearing shaft can be produced relatively simply, for instance by cold forming.

In a further embodiment, the bearing shaft can comprise a head part and a shank part, secured to the head part coaxially to a longitudinal axis of the bearing shaft and in particular welded to it. In this case, the bearing shaft comprises two separately manufactured component parts, that is, a head part and a shank part. From a production standpoint, the head part can be made relatively simply as a cold extruded part. The shank part is a component part that is embodied and can be produced geometrically especially simply. The two separate component parts can be joined to one another quickly and reliably by means of a welded connection, in particular by means of capacitor discharge welding that can advantageously be employed, so that after that, as the bearing shaft, it can be mounted together with the bearing housing to form a compact wiper bearing.

Advantageously, the shank part is embodied as a solid shaft. With a shank part embodied as a solid shaft, it is relatively simple from a production standpoint to make an especially stable bearing shaft, for instance by means of face welding.

Advantageously, the shank part is embodied as a tube. The two-piece version of the bearing shaft allows a shank part embodied as a tube to be used. This makes a considerable reduction in weight of the wiper bearing possible, since usually the bearing shaft is made from a metal material. A shank part embodied as a tube can also be produced as an especially inexpensive component.

Advantageously, the collar has a bearing face for the wiper arm. By the provision of a: bearing face of the collar for the wiper arm, it is possible: to create an especially compact, stable connection between the wiper bearing and the wiper arm. This connection is advantageously embodied on the first end of the bearing shaft, which extends longitudinally outward from the bearing face of the collar.

Advantageously, the bearing shaft has a stop edge for the bearing element. Such a stop edge makes it possible to adjust the spacing between the wiper arm and the bearing element replicably, in a reliable, easily mounted way, utilizing a plastic deformation of the sealing means of the bearing housing that ensues as a consequence of a compressive stress.

Advantageously, an end face of the bearing housing that comes into touch contact with the bearing element is provided with a sealing means. Since a surface contact exists between the bearing element and the bearing housing as well once the wiper bearing has been fastened to the bearing element, it is advantageous here as well to provide the applicable end face of the bearing housing with a sealing means. This second end face can be surface-structured in a similar way to the first end face that is operatively connected to the stop face of the bearing shaft.

The method of the invention is characterized by the following method steps:

introducing the bearing shaft by its step into the bearing housing, until a touch contact is established between the contact face of the bearing housing and the stop face of the bearing shaft;

subjecting the bearing shaft and/or the bearing housing to an axial pressure force, thereby achieving an elastic and/or plastic deformation of the surface structuring, and simultaneously establishing a fastening of the bearing shaft by its first end to the bearing element by means of an axial pressure force;

connecting the wiper arm to the second end of the bearing shaft.

It thus becomes possible to produce a sealing connection of the bearing housing to the bearing shaft and simultaneously to fasten the bearing shaft to the bearing element, achieving a tolerance compensation in the wiper bearing, by means of elastic and/or plastic deformation of the axial sealing means, by means of the pressure force acting axially in the mounting process. The wiper bearing is easy to mount and can be assembled quickly. Since the wiper bearing comprises only three or even two single component parts, namely the bearing shaft (head part, shank part) and the bearing housing, it is practically impossible for the wiper bearing to be mounted wrong.

Further advantageous features of the invention will become apparent from the description.

BRIEF DESCRIPTION OF THE DRAWINGS

The invention will be described in further detail below in terms of several exemplary embodiments in conjunction with the associated drawings. Shown are.

DESCRIPTION OF THE PREFERRED EMBODIMENTS

Figure 1:
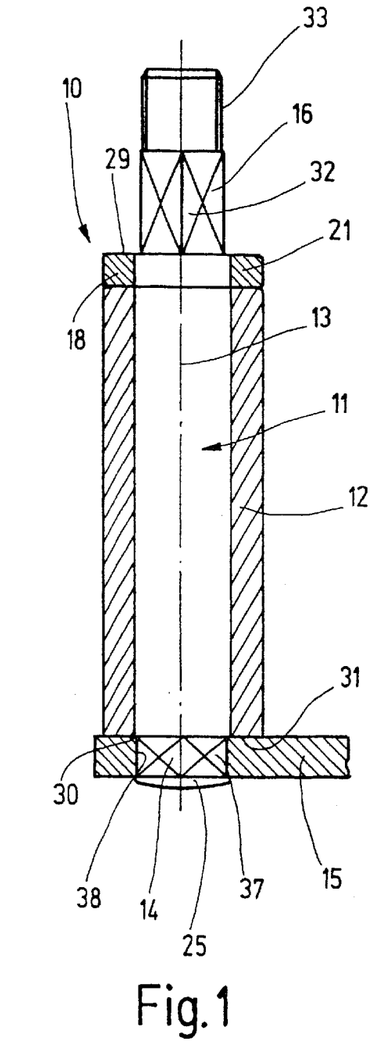
FIG. 1, a schematic view of a wiper bearing in longitudinal section, secured to a bearing element.

FIG. 1, a wiper bearing identified overall by reference numeral 10 is shown, which is secured to a bearing element 15. The wiper bearing 10 is intended for a wiper system of a vehicle (not shown) and includes a bearing shaft 11, which is received in a bearing housing 12 coaxially to a longitudinal axis 13 and is connected to a bearing element 15 in a manner fixed against relative rotation. The wiper bearing 10 serves to transmit a torque from the bearing element 15 to a wiper arm 17 (see also FIG. 9). The bearing housing 12 is embodied as a tubular component and relative to the bearing shaft 11 is disposed coaxially in such a way that it surrounds the bearing shaft 11 radially, or in other words around the circumference. The bearing shaft 11 has two ends 14, 16 protruding from the bearing housing 12; a first end 14 serves to fasten the wiper bearing 10 to the bearing element 15, and a second end 16 serves to connect it to the wiper arm 17 (see also FIG. 9). The bearing shaft 11 is provided on its second end 16 with a connection element 32, preferably embodied as a hexagonal face, which is adjoined terminally by a portion provided with a male thread 33. The connection element 32 serves to connect the wiper bearing 10 to the wiper arm 17 in a manner fixed against relative rotation, while the portion of the second end 16 of the bearing shaft 11 provided with the thread 33 is intended for axial fixation of the wiper arm 17 to the bearing face 29 of the collar 21 of the bearing shaft 11. The first end 14 of the bearing shaft 11 is also provided with a fastening portion 37, embodied as a hexagonal face, which is received by positive engagement in a through opening 38 of the bearing element 15 that is correspondingly embodied as a hexagonal socket. The fastening of the wiper bearing 10 or bearing shaft 11 to the bearing element 15 is done, in the exemplary embodiment of FIG. 1, by means of a rivet connection 25. The bearing shaft 11 has an axial stop means 18, which is embodied as a collar 21 protruding radially from the bearing shaft 11. Toward the second end 16, the collar 21 is provided with a bearing face 29, which serves as a support for the wiper arm 17 to be connected to the second end 16. The bearing shaft 11 is also provided, on the first end 14, with a stop edge 30, which during the mounting of the wiper bearing 10 guarantees an axially correct positioning of the bearing element 15 relative to the bearing shaft 11.

Figure 2:
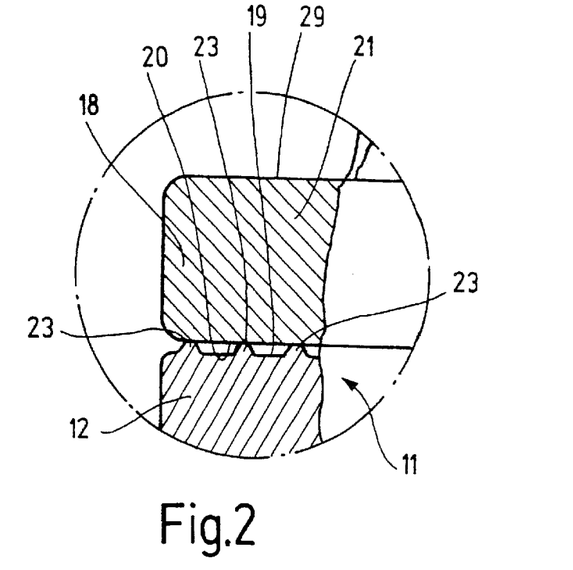
FIG. 2, a detail on a larger scale of the connection between the bearing housing and the bearing shaft.

As seen from FIG. 2, the stop means 18 embodied as a collar 21 has a stop face 20, which is operatively connected to a contact face 19 of the bearing housing 12. The contact face 19 of the bearing housing 12 is embodied as a surface-structured faced, and the stop face 20 of the bearing shaft 11 is embodied as a smooth face. The surface-structured contact face 19 of the bearing housing 12 serves to furnish an axial sealing means 23, which as a closed ring is in touch contact with the stop face 20 of the collar 21, forming a hermetic seal. The sealing means 23 is embodied as at least one and in the present case as three annular beads 23 on the contact face 19 of the bearing housing 12. The bearing housing 12 is made from a material that has a lower intrinsic rigidity than the material comprising the bearing shaft 11. For instance, the bearing housing 12 can be made from an elastically and/or plastically deformable plastic material, and the bearing shaft 11 can be made from a relatively rigid metal material. The three annular beads 23 acting as the sealing means extend coaxially to one another on the contact face 19 of the bearing housing 12, which face is in operative connection on the face end with the collar 21. The stop face 20 in touch contact with the annular beads 23 extends radially across the entire annular closed collar 21 that protrudes radially from the bearing shaft 11.

Figure 3:
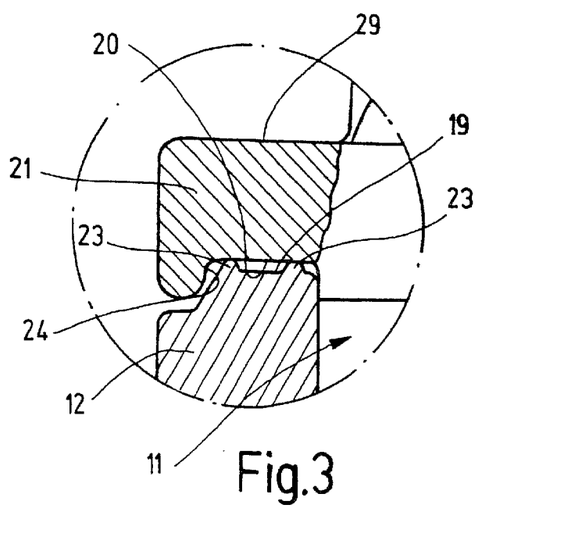
FIG. 3, a detail on a larger scale of an alternative embodiment of the connection between the bearing housing and the bearing shaft.

FIG. 3 shows a second embodiment of the wiper bearing 10, in which the stop face 20 of the collar 21 is embodied as a bottom face of a receiving groove 24, in which the sealing means 23 is radially shielded off from the outside once the operative connection has been made between the stop face 20 and the contact face 19. In this exemplary embodiment of FIG. 3, only two coaxial, annularly extending annular beads 23 on the face-end contact face 19 of the bearing housing 12 are provided, protruding axially from the contact face 19. The receiving groove 24 also extends coaxially to the longitudinal axis 13, with respect to the sealing means 23, in the form of a closed receiving ring. In the two embodiments, shown in FIGS. 1–3, of the operative connection between the stop face 20 and the contact face 19, the bearing shaft is embodied as a one-piece component.

Figure 4:
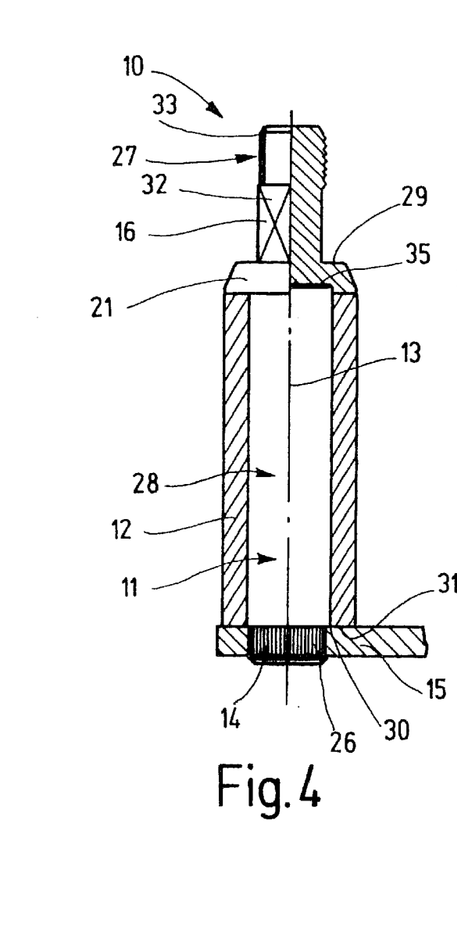
FIG. 4, a schematic side view of a wiper bearing in longitudinal section, connected to a bearing element, in a third embodiment.

In a third embodiment of FIG. 4, the bearing shaft 11 is embodied as a two-piece component; the bearing shaft 11 comprises a head part 27 and a shank part 28, which is secured and in particular welded to the head part, coaxially to the longitudinal axis 13 of the bearing shaft 11. In the exemplary embodiment of FIG. 4, the shank part 28 is embodied as a solid shaft, which is connected to the head part 27 by means of a weld 35, in particular a capacitor discharge weld. The fastening of the bearing shaft 11 to the bearing element 15 by the first end 14 is effected in this exemplary embodiment by means of a nonpositive connection 26, which can be obtained for instance by calking the first end 14 of the bearing shaft 11 to the correspondingly embodied bearing element 15, which preferably has a cylindrical through opening 30.

Figure 5:
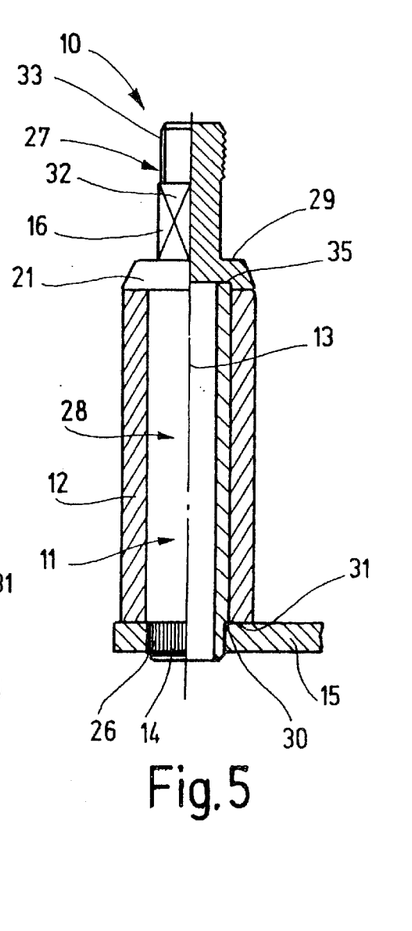
FIG. 5, a schematic side view of a wiper bearing in longitudinal section, connected to a bearing element, in a fourth embodiment.

FIG. 5 shows a fourth embodiment of the wiper bearing 10, in which the bearing shaft 11 is again embodied in two pieces, that is, with a head part 27 and a shank part 28, which are joined together by a weld 35. However, unlike FIG. 4, the shank part 28 is not embodied as a solid shaft by rather as a hollow shaft, or tube. Otherwise, the fourth embodiment of FIG. 5 is equivalent to the third embodiment of FIG. 4.

Figure 6:
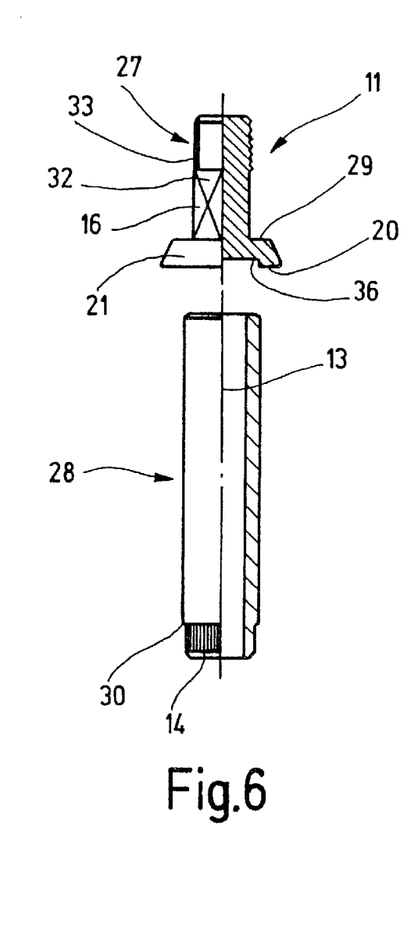
FIG. 6, a schematic side view of a bearing shaft, in longitudinal section, of FIG. 5 in the non-connected state.

In FIG. 6, the two-piece bearing shaft 11 is shown before the head part 27 is joined to the shank part 28 by means of a weld. The collar 21 of the head part 27, on its face end, has a seat 36, to guarantee positioning of the shank part 28 on the head part 27 in a way that makes mounting easy, so that a correct connecting weld can be made between the shank part 28 and the head part 27 at the seat 36. The stop face 20, embodied as a closed ring, of the bearing shaft 11 extends circumferentially around the seat 36 located on the inside in such a way that on the corresponding face end of the head part 27, it protrudes in the axial direction, spaced apart from the seat 36. This averts a negative effect on the stop face 20 by the connecting weld, for instance from deformation occurring as a consequence of a thermal influence. The first end 14 of the bearing shaft 11 or of the shank part 28 has a surface-structured, essentially cylindrical outer surface that is suitable for producing the nonpositive connection 26 to the bearing element 15.

Figure 7:
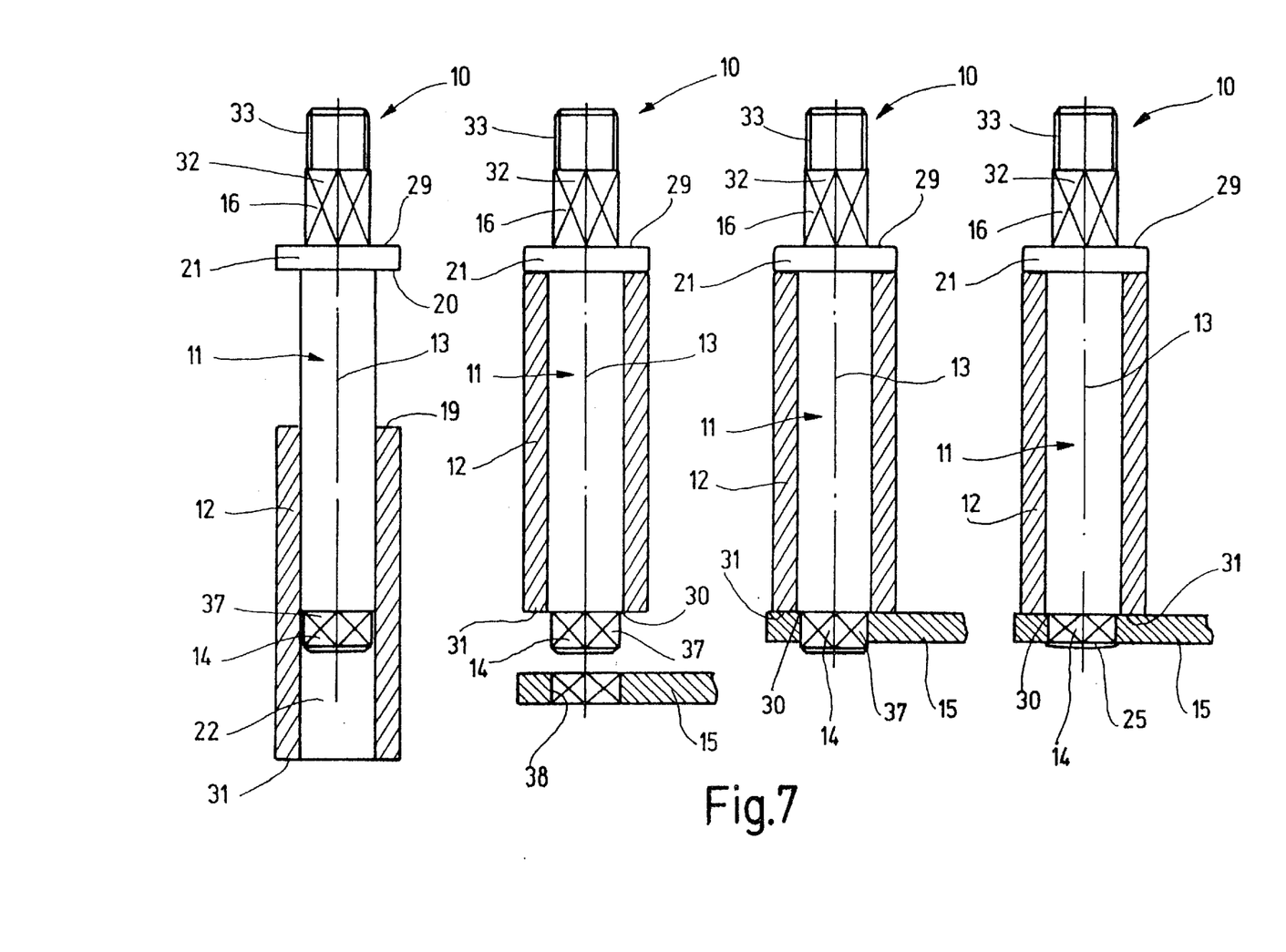
FIG. 7, a plurality of schematic side views in longitudinal section, showing various mounting steps for producing the wiper bearing of FIG. 1.

FIG. 7, in four successive method steps, illustrates the mounting of the wiper bearing 10 and its fastening to the bearing element 15. This illustrates the mounting of the embodiment of FIG. 1. As the first mounting step, shown on the left in FIG. 7, the bearing shaft 11 is introduced by its shank into the bearing housing 12 until a touch contact is established between the contact face 19 of the bearing housing 12 and the stop face 20 of the bearing shaft 11. The shank of the bearing shaft 11 is received in the process by a receiving chamber 22 of the bearing housing 12, which is rotationally symmetrical to the longitudinal axis 13 and in particular is cylindrical. In the view shown second from left in FIG. 7, the shank of the bearing shaft 11 has been introduced entirely into the bearing housing 12 and received in its receiving chamber 22 in such a way that the bearing shaft, or its shank, is guided radially by the wall of the tubular bearing housing 12. The first end 14, preferably embodied as a hexagon 37 and protrudes axially from the bearing housing 12, is thrust into the correspondingly embodied hexagonal through opening 38 of the bearing element 15 in such a way that a free portion of the first end 14 protrudes outward from the through opening 38 (see the view third from left in FIG. 7). A small gap, not shown, can remain between the stop edge 30 and the contact face of the bearing element 15. In the fourth view in FIG. 7, the portion of the first end 14 of the bearing shaft 11 protruding past the bearing element 15 is deformed plastically by means of a pressure force to be imposed from outside, in such a way that a rivet connection 25 is formed between the bearing shaft 11 and the bearing element 15. To introduce the requisite external pressure or deformation force for producing the rivet connection 25, the bearing face 29 of the collar 21, which face is oriented, as an annular face freely accessible from outside, toward the second end 16 of the bearing shaft 11, can be used as an outer bracing face of the wiper bearing 10. During the production of the rivet connection 25 by means of an axial pressure force, an elastic and/or plastic deformation of the surface structuring of the contact face 19 of the bearing housing 12 simultaneously ensues, that is, the annular beads acting as an axial sealing means 23, as a result of the operative connection of the smooth stop face 20 of the collar 21 of the bearing shaft 11, which face is in touch contact with these annular beads. This elastic and/or plastic deformation of the surface structuring leads to a corresponding, but slight reduction in the axial length of the bearing housing 12, so that the aforementioned small gap, not shown in FIG. 7, between the stop edge 30 and the bearing element 15 is closed and thus eliminated as a. result of the relative motion of the bearing housing 12 and bearing element 15 with respect to the bearing shaft 11. In this way, by means of a pressure force required to fasten the bearing shaft 11 to the bearing element 15, it is possible to establish the desired or necessary intermediate spacing between the bearing element 15 and the wiper arm 17 (not shown in FIG. 7) quickly and in a way that can be replicated precisely. The wiper bearing 10 designed in this way thus makes it possible in an easily mounted and reliable way to achieve a tolerance compensation between the individual components (the bearing shaft 11, bearing sleeve 12, bearing.element 15). Furthermore, a sealing connection between the stop face 20 of the collar 21 of the bearing shaft 11 and the contact face 19 of the bearing housing 12 is created by the elastic and/or plastic deformation of the surface structuring.

Figures 8, 10:
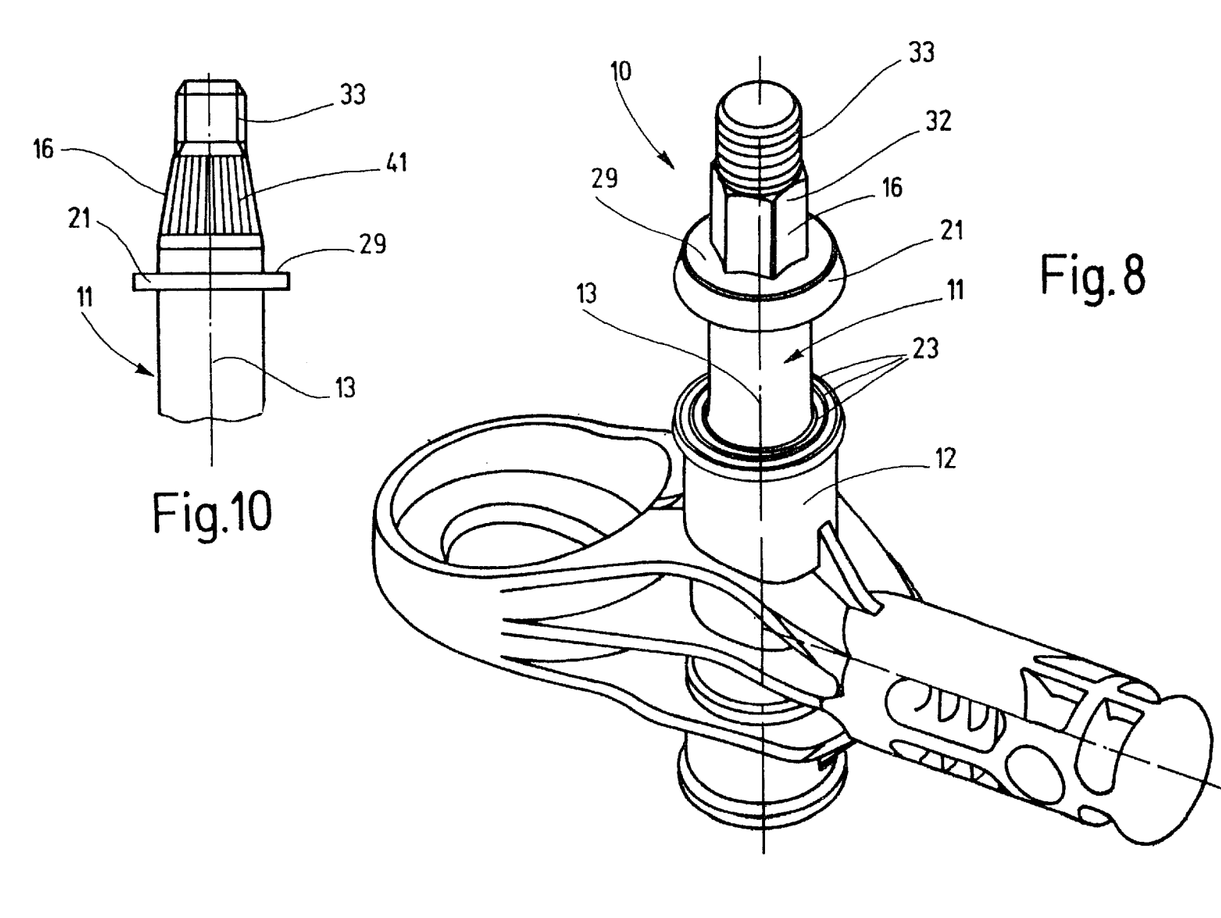
FIG. 8, a schematic, perspective view of a bearing shaft introduced partway into a bearing housing.
FIG. 10, a schematic side view of a bearing shaft, shown in fragmentary form, of a further embodiment.

FIG. 8 shows a schematic, perspective view in which the bearing shaft 11 is introduced partway by its shank into the receiving chamber 22 (not shown in FIG. 8) of the bearing housing 12. The wiper bearing 10 of FIG. 8 is thus equivalent in principle to that shown on the left in FIG. 7.

Figure 9:
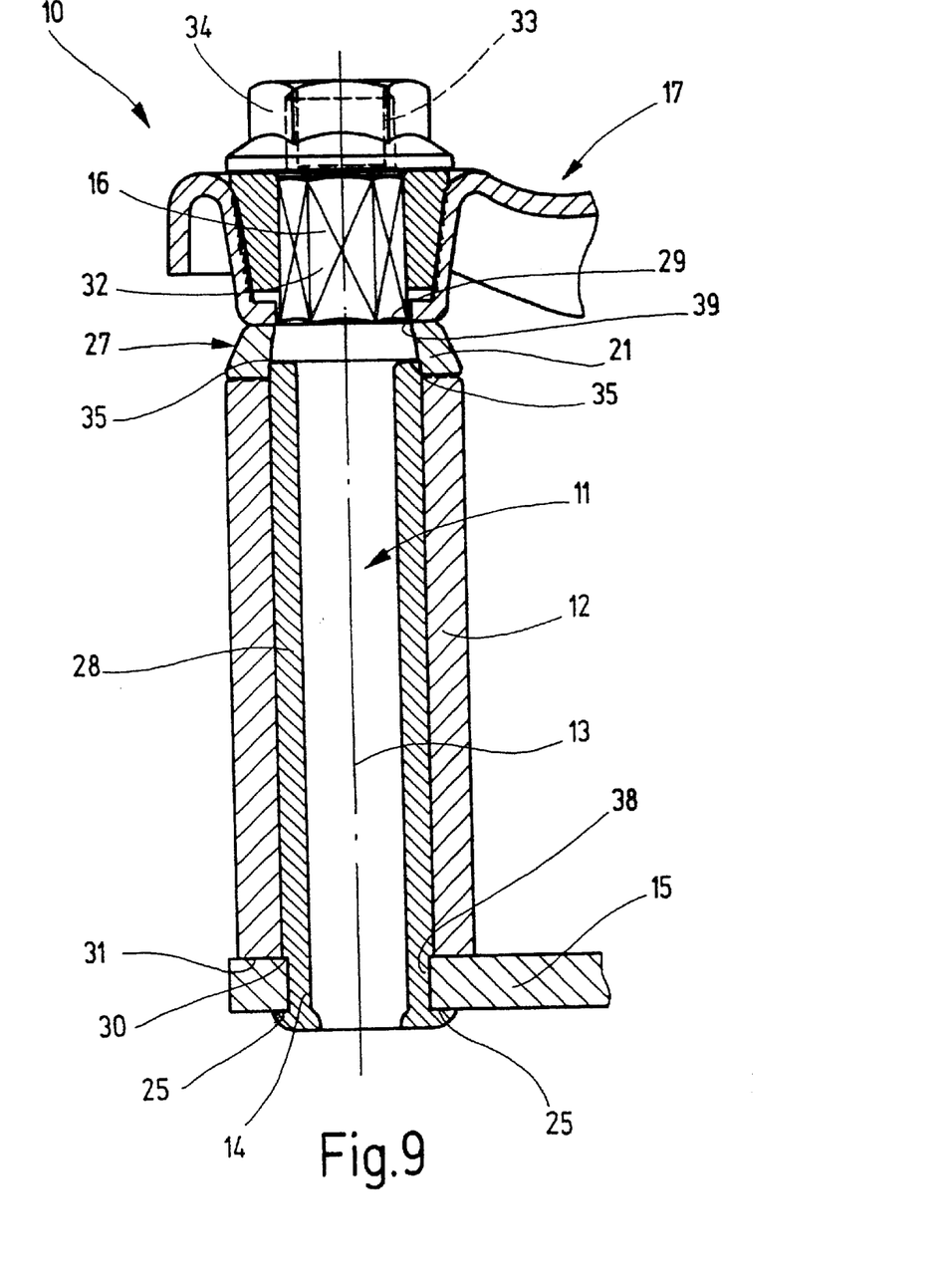
FIG. 9, a schematic side view of a wiper bearing, in longitudinal section, secured to a bearing element and connected to a wiper arm.

FIG. 9 shows the fully mounted wiper bearing 10, which has a two-piece bearing shaft 11 that comprises the head part 27 and the shank part 28 that are joined together by means of the weld 35 on their face ends. The bearing shaft 11 is secured by its first end 14 by means of the rivet connection 25 to the bearing element 15, which for the sake of producing the rivet connection 25 is provided with the hexagonal through opening 38. On its second end 16, the bearing shaft 11 is connected to the wiper arm 17 in a manner fixed against relative rotation relative to the longitudinal axis 13. This connection between the bearing shaft 11 and the wiper arm 17 is obtained by providing that the connection part 32, embodied as a hexagonal face, of the second end 16 of the bearing shaft 11 cooperates operatively with a corresponding through opening 39, embodied as a hexagonal socket, of the wiper arm 17. A nut 34 is screwed onto the end of the male thread 33 of the second end 16 of the bearing shaft 11 in such a way that the wiper arm 17 is fixed on the wiper bearing 10 in the axial direction, that is, in the direction of the longitudinal axis 13, and the wiper arm 17 rests flush against the bearing face 29 of the collar 21 of the bearing shaft 11.

FIG. 10 shows a further alternative embodiment of the bearing shaft 11, whose second end 16 has a conical connection part 41 provided with knurling. Otherwise, the second end 16 of the bearing shaft 11 in FIG. 10 is equivalent to that in FIG. 1. A bearing shaft 11 with a conical connection part 41 is relatively easy to make from a production standpoint and enables reliable fastening of the wiper arm 17 to the wiper bearing 10.

Various combinations of the various embodiments of the wiper bearing 10 with one another are possible. For instance, a wiper bearing 10 embodied in accordance with FIG. 4 or 5 can also be provided with a collar 21 that has a receiving groove 24. The possibility also exists of fastening a wiper bearing 10 embodied in accordance with FIG. 1 to the bearing element 15 by means of a nonpositive connection (calking) in accordance with FIG. 4 or 5.

In an embodiment not shown, an end face 31 of the bearing housing 12 that comes into touch contact with the bearing element 15 can also be provided with a corresponding sealing means.

What is claimed is:

1. A wiper bearing for a vehicle wiper system, including a bearing shaft that is received in a bearing housing and is connected to a bearing element and a wiper arm in such a way that a torque can be transmitted from the bearing element to the wiper arm, the bearing shaft having an axial stop means with a stop face, characterized in that the stop face (20) is operatively connected to a contact face (19) of the bearing housing (12), and the contact face (19) is surface-structured so as to form an axial sealing means (23), which as a closed ring is in touch contact with the stop face (20) of the collar (21), forming a hermetic seal.

2. The wiper bearing of claim 1, characterized in that the bearing housing (12) radially surrounds the bearing shaft (11), and the bearing shaft (11) has two ends (14, 16) protruding from the bearing housing (12), a first end (14) being fastened to the bearing element (15) and a second end (16) being connected to the wiper arm (17).

3. The wiper bearing of claim 1, characterized in that the stop face (20) of the bearing shaft (11) is embodied as smooth and the contact face (19) of the bearing housing (12) is embodied as surface-structured.

4. The wiper bearing of claim 1, characterized in that the stop means (18) is embodied as an annular, closed collar (21) protruding radially from the bearing shaft (11).

5. The wiper bearing of claim 4, characterized in that the stop face (20) extends in the radial direction over the entire width of the collar (21).

6. The wiper bearing of claim 4, characterized in that the collar (21) has a bearing face (29) for the wiper arm (17).

7. The wiper bearing of claim 1, characterized in that the sealing means (23) is embodied as at least one annular bead (23) on the contact face (19) of the bearing housing (12), and the bearing housing (12) is produced from a material that has a lower intrinsic rigidity than the material of the bearing shaft (11).

8. The wiper bearing of claim 1, characterized in that the surface-structured contact face (19) is embodied as an annular end face of the bearing housing (12), the bearing housing having a receiving chamber (22) that is rotationally symmetrical with respect to the longitudinal axis and is cylindrical.

9. The wiper bearing of claim 1, characterized in that the stop face (20) is embodied as a bottom face of a receiving groove (24), in which the sealing means (23) is shielded radially from the outside.

10. The wiper bearing of claim 1, characterized in that the bearing shaft (11) is secured to the bearing element (15) by means of a rivet connection (25).

11. The wiper bearing of claim 1, characterized in that the bearing shaft (11) is secured to the bearing element (15) by means of a nonpositive connection (26).

12. The wiper bearing of claim 1, characterized in that the bearing shaft (11) is embodied in one piece.

13. The wiper bearing of claim 1, characterized in that the bearing shaft (11) comprises a head part (27) and a shank part (28), secured to the head part coaxially to a longitudinal axis (13) of the bearing shaft (11) and welded to it.

14. The wiper bearing of claim 13, characterized in that the shank part (28) is embodied as a solid shaft.

15. The wiper bearing of claim 13, characterized in that the shank part (28) is embodied as a tube.

16. The wiper bearing of claim 1, characterized in that the bearing shaft (11) has a stop edge (30) for the bearing element (15).

17. A method for mounting a wiper bearing of claim 1, characterized by the following method steps:
  introducing the bearing shaft (11) by its step into the bearing housing (12), until a touch contact is established between the contact face (19) of the bearing housing (12) and the stop face (20) of the bearing shaft (11);
  subjecting the bearing shaft (11) and/or the bearing housing (12) to an axial pressure force, thereby achieving an elastic and/or plastic deformation of the surface structuring, and simultaneously establishing a fastening of the bearing shaft (11) by its first end (14) to the bearing element (15) by means of an axial pressure force;
  connecting the wiper arm (17) to the second end (16) of the bearing shaft (11).

* * * * *